March 15, 1966     A. E. SMOLL     3,241,137

TRANSPONDER-TYPE BEACONS

Filed May 5, 1958     3 Sheets-Sheet 1

INVENTOR
ALLEN E. SMOLL
BY John C. Black
ATTORNEY

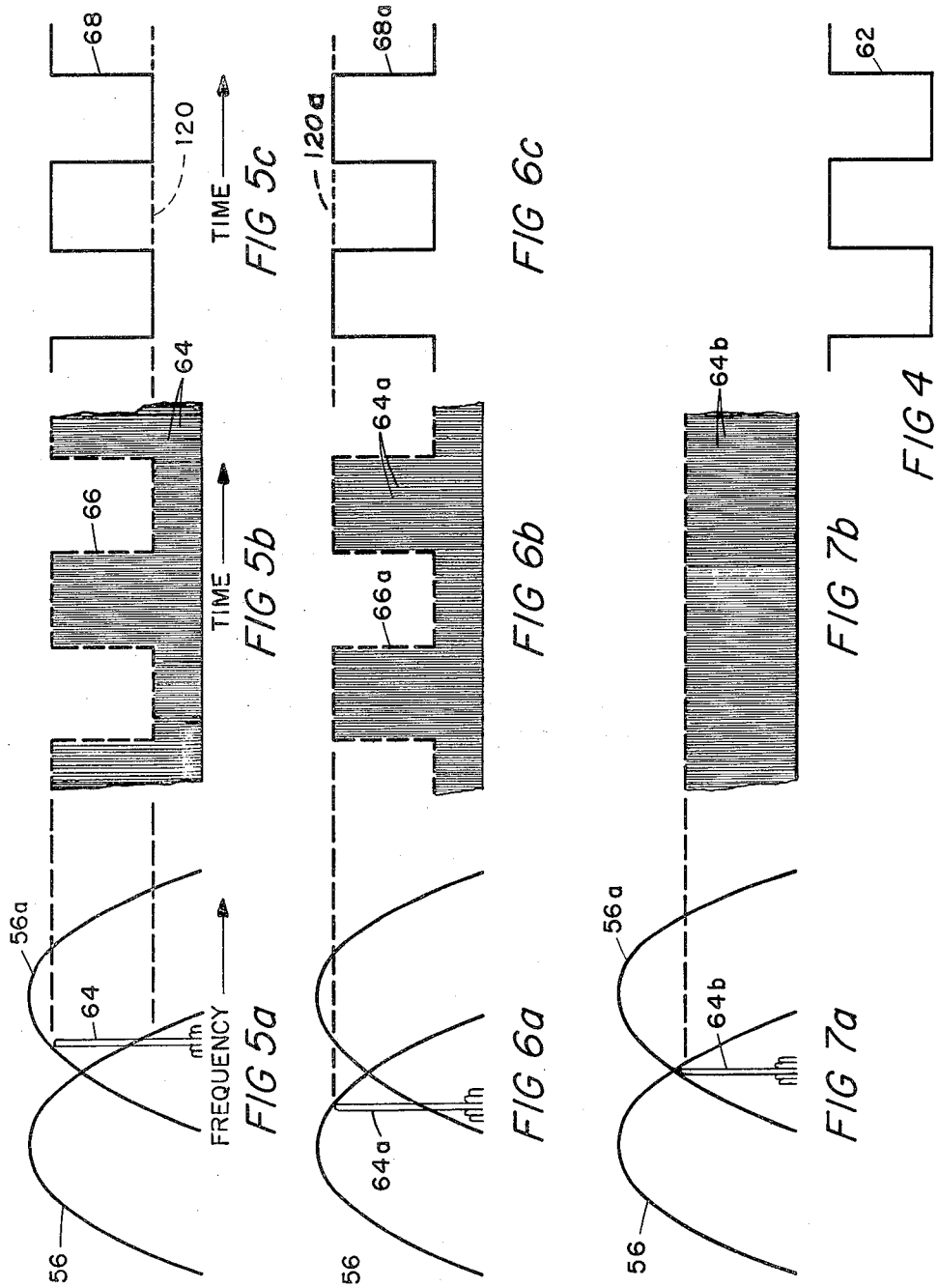

United States Patent Office 3,241,137
Patented Mar. 15, 1966

3,241,137
TRANSPONDER-TYPE BEACONS
Allen E. Smoll, Arlington, Mass., assignor to Stewart-Warner Corporation, Chicago, Ill., a corporation of Virginia
Filed May 5, 1958, Ser. No. 733,792
9 Claims. (Cl. 343—6.8)

This invention relates to radar beacon sets of the type employed on missiles, aircraft, or the like to assist in tracking or following the missiles by radar.

One object of the present invention is to provide a new and improved beacon set of the type adapted to generate reply pulses in response to incoming radar pulses, so that the distant radar set will receive strong reply pulses capable of effective and accurate registration on the radar set.

A further object is to provide a new and improved beacon which is arranged so that the frequency of the reply pulses will correspond closely with the frequency of the incoming pulses, to insure that the reply pulses will register on the radar set.

Another object is to provide a new and improved beacon which is arranged so that the frequency of the reply pulse transmitter is varied to track or follow any variations in the frequency of the incoming pulses.

It is a further object to provide a new and improved beacon in which the incoming pulses and the reply pulses are compared with a passive frequency standard, with or without the interposition of an active frequency standard, and in which the comparison is utilized to tune the reply pulse transmitter to the frequency of the incoming pulses.

Still another object is to provide a radar beacon which is effective and reliable, yet is compact, light in weight, and reasonably simple in construction.

Further objects and advantages of the present invention will appear from the following description, taken with the accompanying drawings, in which:

FIG. 4 is a diagrammatic oscillogram showing the dither signal or action of the arrangement shown in FIG. 3;

FIG. 5a is a graphical representation showing the characteristics of the dither tuned filter employed in the beacon of FIG. 2, together with a superimposed representation of a pulse at a frequency somewhat greater than the average frequency of the dithered filter;

FIG. 5b is a diagrammatic oscillogram showing the pulses as modulated by the dither action represented in FIG. 5a;

FIG. 5c is a diagrammatic oscillogram showing the demodulated control signal corresponding to the conditions of FIGS. 5a and 5b;

FIG. 6a is a view similar to FIG. 5a, but representing a pulse having a frequency somewhat less than the average frequency of the dithered filter;

FIGS. 6b and 6c are views similar to FIGS. 5b and 5c but for the conditions represented in FIG. 6a;

FIG. 7a is a view similar to FIGS. 5a and 6a, but with a pulse having a frequency corresponding to the average frequency of the dithered filter;

FIG. 7b is a view similar to FIGS. 5b and 6b, but for the conditions represented in FIG. 7a.

As already indicated, one important object of the invention is to provide a beacon set having a reply pulse transmitter which is arranged so that its frequency will track the frequency of the incoming radar pulses. In this way, the frequency of the reply pulses will remain substantially the same as the frequency of the incoming pulses despite variations in the incoming frequency. Thus, the reply pulses will always be properly registered on the distant radar set.

The beacons of the present invention find many applications, but are particularly valuable to assist in tracking aircraft, missiles, or the like from a radar station on the ground or in another aircraft. The radar set sends out brief pulses of ultra high frequency energy, which strike the missile and are reflected back to the radar set. At close ranges, the reflected pulses are sufficiently strong to register satisfactorily on the radar set. However, at longer ranges, the reflected pulses are too weak to be satisfactorily displayed. Consequently, the missile or the like may be equipped with a beacon which receives the incoming pulses from the radar set and transmits strong reply pulses. These reply pulses from the beacon transmitter may be satisfactorily displayed on the radar set at extremely long ranges, so that the missile may be tracked reliably and accurately.

One difficulty with such beacons arises from the fact that most, if not all, radar sets are subject to an appreciable drift in frequency. The beacon transmitter may also drift in frequency. Thus, it is possible for the reply pulses to be at a significantly different frequency from that of the incoming radar pulses. Under such conditions, the reply pulses may not be properly registered on the radar set.

However, the present invention provides arrangements whereby the reply pulse transmitter of the beacon is varied automatically, so that its frequency will track that of the incoming radar pulses.

Figure 1:
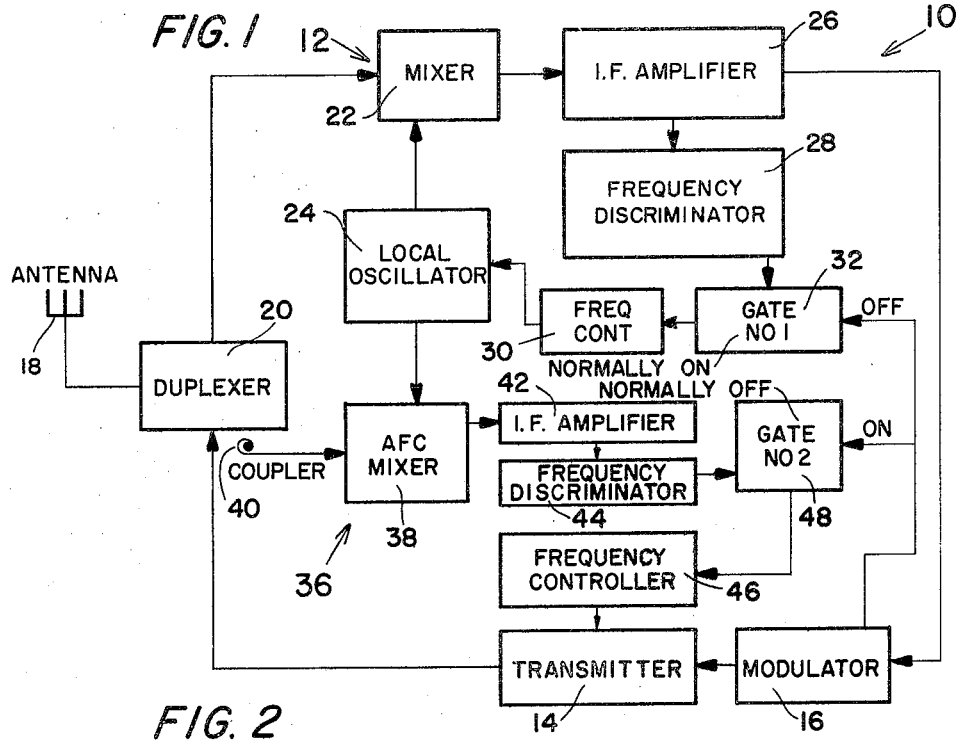
FIG. 1 is a schematic block diagram of a radar beacon set to be described as one illustrative embodiment of the present invention.

It will be seen that FIG. 1 illustrates a radar beacon set 10 adapted to be employed on a missile, aircraft, or the like. In general, the beacon 10 employs a receiver 12 adapted to be supplied with incoming radar pulses. A transmitter 14 is employed to generate the reply pulses. To trigger the transmitter 14 a modulator 16 is connected between the output of the receiver 12 and the modulation input of the transmitter 14, so that a reply pulse will be generated in response to each incoming pulse. The modulator 16 is preferably arranged to introduce a small fixed time delay so that each reply pulse will follow the corresponding incoming pulse by a definite time interval. All of this is known in the beacon art.

The illustrated beacon 10 employs a single antenna 18 which serves both the receiver 12 and the transmitter 14. To this end, the antenna 18 is connected to a transmit-receive duplexer 20, which normally is operative to supply the incoming pulses to the receiver 12. When the transmitter 14 supplies a reply pulse to the duplexer, the duplexer acts in a known manner to route the reply pulse to the antenna 18, while preventing any substantial transmission of energy to the receiver 12.

It will be seen that the illustrated receiver 12 is provider with a first superheterodyne mixer 22, adapted to convert the incoming pulses to intermediate frequency pulses. A local oscillator 24 supplies a heterodyne signal to the mixer 22.

The output of the mixer 22 is supplied to an intermediate frequency amplifier 26, which, in turn, operates a frequency discriminator 28, which may be of the known type adapted to generate a control signal which is a function, both in magnitude and polarity, of any variations of the signals from the established intermediate frequency.

The control signal from the discriminator 28 is employed to vary the frequency of the local oscillator 24 so as to maintain the incoming intermediate frequency pulses at the established intermediate frequency. Thus, the output of the frequency discriminator 28 is fed to a signal responsive frequency controller 30. If the incoming intermediate pulses depart from the established intermediate frequency, the frequency discriminator 28 and the frequency controller 30 vary the tuning of the local oscillator 24 so as to return the pulses to the established intermediate frequency. It will be noted that a first gate or electrically operable switch 32 is interposed between the discriminator 28 and the controller 30. Normally, the gate 32 is "on," so that the discriminator 28 is activated. However, the control input of the gate 32 is connected to the modulator 16 so that the gate 32 will be turned off when the transmitter 14 is generating a reply pulse.

In order to gauge the frequency of the reply pulse transmitter, the receiver 12 is provided with a second section 36, which might be regarded as a second receiver. As illustrated, the second receiver 36 includes a second mixer 38, which may be regarded as an automatic frequency control mixer. The second mixer 38 receives a heterodyning signal from the local oscillator 24. Thus, the local oscillator 24 supplies both mixers 22 and 38.

Means are provided to supply a small portion of the reply pulse energy to the second mixer 38. As shown, such means comprise a coupler loop or link 40, which is loosely coupled to the output of the transmitter 14 and is connected to the input of the mixer 38. It will be understood that the second mixer 38 converts the reply pulse signals to intermediate frequency signals.

Such reply intermediate frequency signals are fed to a second intermediate frequency amplifier 42 and thence to a second frequency discriminator 44, which serves as a second passive frequency standard. Like the first discriminator 28, the second discriminator 44 is adapted to supply a control signal which varies as a function of both the magnitude and direction of any deviation of the intermediate frequency reply pulses from the established intermediate frequency. The intermediate frequencies of the two discriminators 28 and 44 may be the same.

Thus, the second discriminator 44 effectively relates the frequency of the reply pulses to the frequency of the local oscillator 24, which in turn is related to the frequency of the incoming pulses. The signal from the second discriminator 44 is employed to operate a second frequency controller 46, which varies the tuning of the transmitter 14 so as to maintain the intermediate frequency reply pulses at the established intermediate frequency. In this way, the transmitter 14 is effectively tuned to substantially the same frequency as that of the incoming pulses.

In the illustrated arrangement, a second gate 48 is interposed between the second frequency discriminator 44 and the frequency controller 46. Normally, the gate 48 is off or de-activated, so that the frequency controller 46 is not disturbed during the reception of incoming pulses. However, the second gate 48 is connected to the modulator 16 and is adapted to be turned on by a trigger pulse therefrom. In this way, the second frequency discriminator 44 and the second frequency controller 46 are activated for the time during which each reply pulse is being transmitted.

Thus, the first discriminator 28 and first frequency controller 30 are activated by the first gate 32 during the reception of each incoming pulse, so that the local oscillator 24 is tuned to maintain the intermediate frequency incoming pulses at the established intermediate frequency. The local oscillator 24 thus becomes an active frequency standard, to which the frequency of the transmitter 14 may be related. During the transmission of each reply pulse, the second gate 48 activates the second frequency discriminator 44 and the second frequency controller 46 to maintain the intermediate frequency reply pulses at the established intermediate frequency. In this way, the frequency of the transmitter 14 is maintained at substantially the frequency of the incoming pulses.

FIGS. 2–7b illustrate a modified beacon 52 to be described as a second illustrative embodiment of the present invention. In the second beacon 52, the antenna 18, the duplexer 20, the transmitter 14, and the modulator 16 are arranged substantially the same as in the beacon of FIG. 1, and are given the same reference characters. However, the arrangement of the receiver and the frequency controlling components is somewhat different.

Figure 2:
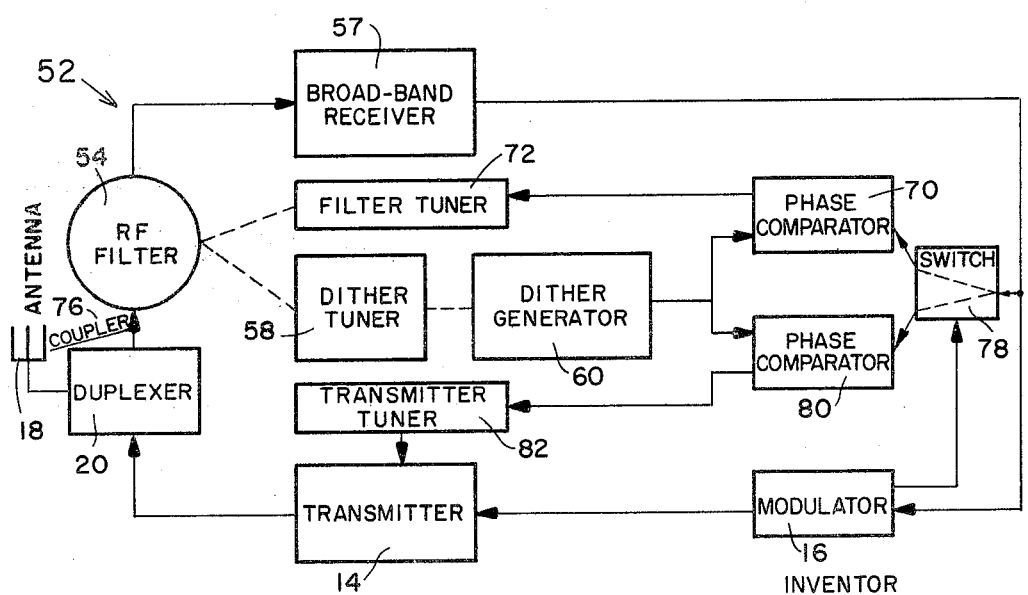
FIG. 2 is a schematic block diagram of a second radar beacon set, constituting another illustrative embodiment of the present invention.

Thus, the duplexer 20 of FIG. 2 routes the incoming pulses to a band pass radio frequency filter 54. Merely by way of example, the tuning curve or characteristic of the filter 54 may be somewhat as illustrated at 56 in FIGS. 5a, 6a and 7a. The output of the filter 54 is fed to a broad band receiver 57. As in FIG. 1, the output of the receiver 57 is connected to the modulator 16 and is employed in the modulator to generate trigger pulses for the reply pulse transmitter 14.

In the arrangement of FIG. 2, the frequency of the band pass filter 54 is varied or dithered in a cyclical fashion by a dither tuner 58, operable by a dither generator 60. In other words, the entire frequency characteristic of the filter 54 is shifted back and forth in a rapid, cyclical manner, over a sufficient range to cover any possible variation or drift in the frequency of the incoming pulses. In FIGS. 5a, 6a and 7a, the curve 56 represents the low frequency extreme of the dither action, while the high frequency extreme is represented by the curve 56a. It will be realized that the tuning characteristic of the filter 54 may be dithered over any desired range.

FIG. 4 comprises a curve 62 representing the cyclical characteristics or wave form of the dither tuner 58 and generator 60. In this case, the curve 62 is a square wave, but any other appropriate wave form might be employed.

Unless the incoming pulses are at the average frequency of the dither cycle, the effect of the dither tuner 58 is to impress modulation on the incoming pulses. This is illustrated in FIGS. 5b and 6b, which represent conditions in which the incoming pulses are higher and lower, respectively, in frequency than the average frequency of the dither cycle. In FIGS. 5a and 6a, the incoming pulses are represented by the curves 64 and 64a, only a single pulse being represented in each instance. The pulses are superimposed on the dithered tuning curves 56 and 56a to illustrate the relation between the frequencies of the pulses and the tuning curves.

FIG. 7a illustrates the desired condition in which the frequency of the incoming pulse corresponds to the average frequency of the dithered tuning curves 56 and 56a. In this case, the pulse is represented at 64b. For the condition of FIG. 7a, the dithering action does not impress any substantial modulation on the incoming pulses. This is indicated by FIG. 7b.

It will be noted that the modulation envelopes shown in FIGS. 5b and 6b are similar in wave form but opposite in phase. These modulation envelopes are indicated at 66 and 66a.

FIGS. 5c and 6c comprise curves 68 and 68a representing the signals which result from demodulation of the incoming pulses 64 and 64a for the conditions represented in FIGS. 5b and 6b. Here again, the curves 68 and 68a are of similar wave form but opposite in phase.

During reception of incoming pulses, the output signals 68 from the broad band receiver 57 are fed to a first phase detector or comparator 70. It will be seen that the phase detector 70 is also connected to the dither generator 60. Thus, the phase detector 70 is effective to compare the phase of the dither generator signal 62 with that of the receiver output 68. The phase detector 70 provides an output signal which varies as a function of this comparison, to reflect the difference in phase between the signals 68 and 68a. In other words, the phase detector 70 provides a signal which indicates whether the incoming pulses are at a higher or a lower frequency than the average frequency of the dithered tuning curves 56 and 56a.

The signal from the phase detector 70 operates a frequency controller or tuner 72 which is connected to the band pass filter 54 and is effective to change the frequency thereof. Thus, the effect of the tuner 72 is to adjust the frequency of the filter 54 so that the average frequency of the dithered curves 56 and 56a corresponds to the frequency of the incoming pulses. This is the condition illustrated in FIGS. 7a and 7b.

During transmission of reply pulses, a small portion of the reply pulse energy is fed to the band pass filter 54 by suitable means, such as the illustrated coupler link 76. By means of an electrically operable switch or gate 78, the output of the broad band receiver 57 is shifted to a second phase detector 80, which is similar to the phase detector 70, and thus is effective to compare the phase of the output signals from the receiver 57, with the phase of the dither signal 62. The output signal from the second phase detector 80 operates a frequency controller or tuner 82 which is effective to vary the frequency of the transmitter 14.

Thus, the frequency of the transmitter is adjusted with reference to the frequency of the band pass filter 54, so that the frequency of the reply pulses will correspond with the average frequency of the dither tuning characteristic. In this way, the reply pulse frequency is maintained substantially the same as the frequency of the incoming pulses.

The switch or gate 78 is connected to the modulator 16 and is operated by a trigger pulse therefrom. As already indicated, the switch 78 connects the output of the receiver 57 to the first phase detector 70 for reception of incoming pulses, and to the second phase detector 80 for the reception of reply pulses.

Figure 3:
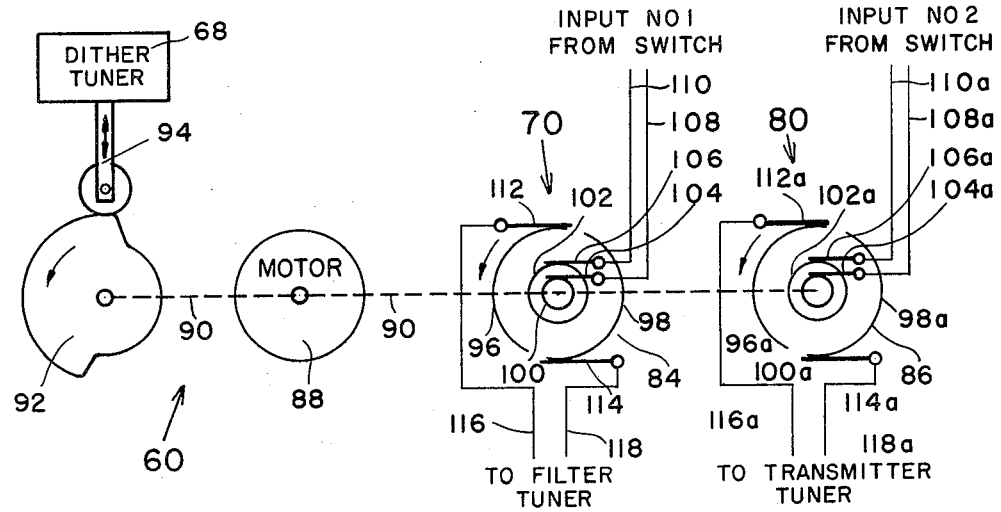
FIG. 3 is a diagrammatic representation of a dither tuner and a phase detector or commutator arrangement which may be employed in the beacon of FIG. 2.

FIG. 3 illustrates the details of one exemplary arrangement for the phase detectors 70 and 80. In this case, they comprise rotatable commutators 84 and 86, adapted to rectify the receiver output signals represented by the curves 68 and 68a. In order that such rectification may reflect a comparison with the dither signal 62, the commutators 84 and 86 are arranged to be driven in synchronism with the dither generator 60. Thus, the dither generator 60 comprises a motor 88 having a shaft 90 adapted to rotate the commutators 84 and 86.

The motor 88 is also arranged to operate the dither tuner 68. In the illustrated arrangement, the motor 88 drives a cam 92 which in turn reciprocates a movable plunger or other tuning member 94 adapted to follow the cam. The reciprocation of the plunger 94 operates the dither tuner 58 and is effective to shift the tuning characteristic of the filter 54 back and forth between its upper and lower limits, as already described.

Illustrated commutator 84 has two segments 96 and 98 which are oriented to correspond with the orientation of the cam 92. Connections are made to the segments 96 and 98 by means of slip rings 100 and 102, which are engaged by brushes 104 and 106. The signals from the receiver 57 are applied to the brushes 104 and 106 by means of leads 108 and 110. It will be understood that the leads 108 and 110 extend to the switch 78 so that the signals from the receiver 57 will be applied to the commutator 84 during the reception of incoming pulses.

The rectified control signals are derived from the commutator 84 by means of brushes 112 and 114 which engage the segments 96 and 98. Output leads 116 and 118 are connected from the brushes 112 and 114 to the filter tuner 72.

Inasmuch as the breaks between the commutator segments 96 and 98 correspond in position to the steps in the cam 92, the signals 68 and 68a from the receiver 57 are rectified in synchronism with the dither signal 62. This synchronized rectification effects a phase comparison between the signals at the receiver output and the dither signal 62.

In FIGS. 5c and 6c, the rectified signals from the commutators 84 are indicated with broken lines at 120 and 120a. It will be noted that the rectified signal 120 is negative in polarity, while the signal 120a is positive. Thus, in this instance, the phase detector 70 provides a negative control signal when the frequency of the input pulses 64 is above the average frequency of the dithered filter 54, while providing a positive control signal when the input frequency is below the average frequency of the filter. These control signals are utilized by the tuner or frequency controller 72 to retune the filter 54 until the average frequency of the dither cycle corresponds to the frequency of the input pulses. As already indicated, this condition is represented by FIGS. 7a and 7b.

The components of the commutator 86 are exactly the same as those of the commutator 84 and hence are given the same reference characters, with the addition of the letter "a." Moreover, the action of the second commutator 86 is the same as that of the commutator 84. However, the switch 78 activates the second commutator when reply pulses are being generated by the transmitter 14. The output of the second commutator 86 is fed to the transmitter tuner 82 and is effective to tune the transmitter so that the frequency of the reply pulses will correspond to the average frequency of the dither cycle. In this way, the reply pulse frequency will be maintained substantially the same as the frequency of the incoming pulses.

Thus, the average frequency of the dithered filter 54 is adjusted to correspond to the frequency of the incoming pulses. Then, the frequency of the transmitter 14 is adjusted to correspond to the average frequency of the dithered filter 54. It will be apparent that the dithered filter 54 provides a frequency standard to which the incoming pulses and the reply pulses are referred so that the reply pulse transmitter may be adjusted to the frequency of the incoming pulses.

Both of the illustrated beacons are reasonably simple in construction and may be produced in compact units which will be light in weight. At the same time, the beacons are sturdy and reliable. Accordingly, they are well suited for use on missiles, aircraft or the like.

Various other modifications, alternative constructions and equivalents may be employed without departing from the true spirit and scope of the invention as exemplified in the foregoing description and defined in the following claims.

I claim:

1. In a radar beacon set for generating reply pulses in response to incoming radar pulses, the combination comprising an antenna, a transmit-receive duplexer connected to said antenna, a receiver connected to said duplexer for receiving incoming pulses, said receiver comprising a first superheterodyne mixer for converting the incoming pulses to an intermediate frequency, a local oscillator connected to said mixer for supplying a heterodyne signal thereto, a first intermediate frequency amplifier connected to the output of said mixer, a first passive frequency standard comprising a frequency discriminator connected to the output of said amplifier to supply a control signal for varying the frequency of said local oscillator so as to bring the pulses at said frequency discriminator to a predetermined frequency, a first normally "on" gate connected between said frequency discriminator and said local oscillator to control the supply of said control signal thereto, a transmitter connected to said duplexer for generating reply pulses, a modulator connected between the output of said receiver and said transmitter to cause said transmitter to generate a reply pulse in response to each incoming pulse, a second superheterodyne mixer coupled to said transmitter for receiving the pulses generated thereby, said local oscillator being connected to said second mixer to supply a heterodyne signal thereto, a second intermediate frequency amplifier connected to the output of said second mixer, a second frequency standard comprising a second frequency discriminator connected to the output of said second intermediate frequency amplifier, a frequency controller connected to said transmitter for varying the frequency thereof in response to control signals from said second frequency discriminator, a second normally "off" gate connected between said second discriminator and said controller to control the supply of control signals thereto, and means for connecting said first and second gates to said modulator for turning said first gate "off" while turning said second gate "on" while said transmitter is generating a pulse, said first frequency discriminator being effective to tune said local oscillator to provide an active frequency standard for said transmitter, while said second frequency discriminator is effective to tune said transmitter with reference to said local oscillator so that the frequency of the transmitter pulses will be maintained substantially the same as the frequency of the incoming pules.

2. In a radar beacon set for generating reply pulses in response to incoming radar pulses, the combination comprising an antenna, a transmit-receive duplexer connected to said antenna, a passive frequency standard comprising a radio frequency band pass filter connected to said duplexer for receiving the incoming pulses therefrom, a broad band receiver connected to the output of said filter, a transmitter connected to said duplexer for generating reply pulses, a modulator connected between the output of said receiver and said transmitter to cause said transmitter to generate a reply pulse in response to each incoming pulse, but delayed with respect thereto, said filter having a dither tuner for shifting the frequency of said filter in a cyclical fashion, dither generator means for operating said dither tuner, said dither tuner generally being effective to place a modulation on said incoming pulses, a first phase detector for comparing the dither modulation from said receiver with said dither generator, a gate for normally activating said first phase detector during reception of incoming pulses, a control tuner connected to said filter for varying the frequency thereof in response to the output of said first phase detector and thereby adjusting the frequency of said filter to the frequency of the incoming pulses, means for coupling said filter to said transmitter for supplying small transmitter pulses to said filter, a second phase detector for comparing the modulation at the output of said receiver with said dither generator, said gate normally being effective to deactivate said second phase detector, means connecting said gates to said modulator for reversing the condition of said gates while said transmitter is generating a pulse, said second phase detector thereby being activated while said first phase detector is deactivated, and a frequency controller connected to said transmitter and responsive to the output of said second phase detector to tune said transmitter to the frequency of said filter, so that the transmitter frequency will be maintained substantially the same as the frequency of the incoming pulses.

3. In a radar beacon for transmitting reply pulses in response to incoming radar pulses, the combination comprising a radio frequency band pass filter, means for feeding the incoming pulses to said filter, a receiver connected to the output of said filter, a transmitter for generating reply pulses, a modulator connected between the output of said receiver and said transmitter for causing said transmitter to generate a reply pulse at an interval after each incoming pulse, first means for comparing the frequency of the incoming pulses with the frequency of said filter, second means responsive to said first means for adjusting the frequency of said filter to correspond with the frequency of the incoming pulses, means for feeding a small portion of the energy of the reply pulses to said filter, third means for comparing the frequency of the reply pulses with the frequency of said filter, and fourth means for adjusting said transmitter to the frequency of said filter so that the reply pulses will be at substantially the same frequency as the incoming pulses.

4. In a beacon set for generating reply pulses in response to incoming pulses, the combination comprising a radio frequency band pass filter, means for supplying the incoming pulses to said filter, a receiver connected to the output of said filter, a transmitter for generating reply pulses, a modulator connected between the output of said receiver and said transmitter to cause said transmitter to generate a reply pulse at an interval after each incoming pulse, means for coupling a small portion of the energy of the reply pulses to said filter, means responsive to the incoming pulses for adjusting the frequency of said filter to the frequency of said incoming pulses, and means responsive to the reply pulses from said receiver to adjust said transmitter to the frequency of said filter so that the reply pulses will be at substantially the same frequency as said incoming pulses.

5. In a beacon set for generating reply pulses in response to incoming pulses, the combination comprising a band pass radio frequency filter, means for supplying the incoming pulses to said filter, a receiver connected to the output of said filter, a transmitter for generating reply pulses, a modulator connected between the output of said receiver and said transmitter to cause said transmitter to generate a reply pulse at an interval after each incoming pulse, means for coupling a small portion of the energy of said reply pulses to said filter, dither means for varying the frequency of said filter in a regular cyclical fashion to impress modulation on said incoming pulses and the reply pulses passing through said filter, first means for comparing the modulation at the output of said receiver to said other means, second means connected to said first means to adjust the frequency of said filter to correspond with the frequency of the incoming pulses, electrically operable switch means normally activating said first means during reception of incoming pulses, third means for comparing the modulation at the output of said receiver with said dither means, fourth means responsive to the output of said third means for tuning said transmitter to the frequency of said filter, said switch means normally being operative to deactivate said third means, and means responsive to the generation of a reply pulse for reversing the condition of said switch means so as to activate said third means and deactivate said first means.

6. In a beacon set for generating reply pulses in response to incoming pulses, the combination comprising a band pass radio frequency filter, means for supplying the incoming pulses to said filter, a receiver connected to the output of said filter, a transmitter for generating reply pulses, means connected between the output of said receiver and said transmitter to cause said transmitter to generate a reply pulse at an interval after each incoming pulse, dither means for varying the frequency of said filter in a cyclical fashion, first means for comparing the modulation at the output of said receiver with said dither means and effective to adjust the frequency of said filter to correspond with the frequency of the incoming pulses, means for supplying some of the energy of said reply pulses to said filter, second means for comparing the modulation at the output of said receiver with said dither means and effective to tune said transmitter to the frequency of said filter, and electrically operable switch means normally activating said first means while deactivating said second means during reception of incoming pulses, and means responsive to the generation of a reply pulse for activating said second means and deactivating said first means.

7. In a beacon set for generating reply pulses in response to incoming pulses, the combination comprising a first receiver, means for supplying the incoming pulses to said first receiver, a transmitter for generating reply pulses, means connected between the output of said first receiver and said transmitter to cause said transmitter to generate a reply pulse at an interval after each incoming pulse, a second receiver, means for supplying some of the energy of the reply pulses to said second receiver, said first and second receivers having respective first and second superheterodyne mixers for converting the incoming pulses and the reply pulses to intermediate frequencies, a local oscillator for supplying a heterodyne signal to both mixers, said first receiver having a first frequency discriminator for generating control signals in response to variations of the incoming pulses from the intermediate frequency of said first receiver, a first frequency controller responsive to the control signals from said discriminator for adjusting the frequency of said local oscillator to maintain the incoming intermediate frequency pulses at the intermediate frequency of said first receiver, said second receiver having a second frequency discriminator for generating control signals in response to variations of the intermediate frequency reply pulses from the intermediate frequency of said second receiver, a second frequency controller responsive to the control signals from said second discriminator and effective to tune said transmitter so as to maintain the intermediate frequency reply pulses at the intermediate frequency of said second receiver, and electrically operable switch means normally activating said first discriminator and controller while deactivating said second discriminator and controller, means responsive to the generation of a reply pulse for activating said second discriminator and controller while deactivating said first discriminator and controller.

8. In a beacon set for generating reply pulses in response to incoming pulses, the combination comprising a receiver, means for supplying the incoming pulses to said receiver, a transmitter for generating reply pulses, means connected between said receiver and said transmitter for causing said transmitter to generate a reply pulse at an interval after each incoming pulse, means for applying some of the energy of the reply pulses to said receiver, said receiver comprising mixer means for converting the incoming pulses and the reply pulses to intermediate frequency pulses, a local oscillator for supplying a heterodyne signal to said mixer means, first frequency discriminator and controller means for comparing the intermediate frequency incoming pulses with the intermediate frequency of said receiver and effective to adjust the frequency of said local oscillator to maintain the intermediate frequency incoming pulses at said intermediate frequency, second frequency discriminator and controller means for comparing the intermediate frequency reply pulses with said intermediate frequency and effective to adjust the frequency of said transmitter to maintain the intermediate frequency reply pulses at said intermediate frequency, and electrically operable switch means for normally activating said first frequency discriminator and controller while deactivating said second frequency discriminator and controller, means responsive to the generation of a reply pulse for activating said second frequency discriminator and controller and deactivating said first frequency discriminator and controller.

9. In a radar beacon set for generating reply pulses in response to received radar pulses, the combination comprising a receiver for receiving the incoming pulses, a transmitter for generating reply pulses, modulator means connected between the output of said receiver and said transmitter to cause said transmitter to generate a reply pulse in response to and at an interval after each incoming pulse, frequency reference means, first means for adjusting said frequency reference means to a predetermined relation to the frequency of the incoming pulses in said receiver, and second means for adjusting the frequency of said transmitter to a predetermined relation to the frequency of said frequency reference means so that the frequency of the reply pulses will be substantially the same as the frequency of the incoming pulses.

References Cited by the Examiner
UNITED STATES PATENTS

| | | | |
|---|---|---|---|
| 2,435,259 | 2/1948 | Wilder | 250—36.19 |
| 2,614,211 | 10/1952 | Goodall | 250—15 |
| 2,640,150 | 5/1953 | Wu | 331—2 |
| 2,704,323 | 3/1955 | Wu | 250—15 |
| 2,755,383 | 7/1956 | Mannheimer | 343—6.8 |

CHESTER L. JUSTUS, *Primary Examiner.*

FREDERICK M. STRADER, *Examiner.*